US011503105B2

(12) United States Patent
Rubenstein et al.

(10) Patent No.: US 11,503,105 B2
(45) Date of Patent: Nov. 15, 2022

(54) SYSTEM AND METHOD FOR CONTENT RETRIEVAL FROM REMOTE NETWORK REGIONS

(71) Applicant: UMBRA Technologies Ltd., Hong Kong (CN)

(72) Inventors: Joseph E. Rubenstein, Beijing (CN); Carlos Eduardo Oré, Saint-Herblain (FR); Jørn Allan Dose Knutsen, Oslo (NO); Fred Broussard, Indianapolis, IN (US); Thibaud Auguste Bernard Jean Saint-Martin, Aubignan (FR)

(73) Assignee: UMBRA TECHNOLOGIES LTD., Hong Kong (CN)

( * ) Notice: Subject to any disclaimer, the term of this patent is extended or adjusted under 35 U.S.C. 154(b) by 180 days.

(21) Appl. No.: 17/097,935

(22) Filed: Nov. 13, 2020

(65) Prior Publication Data
US 2021/0067579 A1    Mar. 4, 2021

Related U.S. Application Data

(63) Continuation of application No. 15/533,958, filed as application No. PCT/US2015/064242 on Dec. 7, 2015, now Pat. No. 10,841,360.
(Continued)

(51) Int. Cl.
*H04L 67/025* (2022.01)
*H04N 21/2183* (2011.01)
(Continued)

(52) U.S. Cl.
CPC ............ *H04L 67/025* (2013.01); *G06F 15/16* (2013.01); *H04L 61/4511* (2022.05);
(Continued)

(58) Field of Classification Search
None
See application file for complete search history.

(56) References Cited

U.S. PATENT DOCUMENTS 4,890,281 A    12/1989  Balboni et al.
5,828,847 A    10/1998  Gehr et al.
(Continued)

FOREIGN PATENT DOCUMENTS

CN    1315088 A    9/2001
CN    1392708 A    1/2003
(Continued)

OTHER PUBLICATIONS

"Operations and Quality of Service Telegraph Services, Global Virtual Network Service," ITU-T Standard, International Telecommunication Union, Geneva, Switzerland, No. F.16, Feb. 21, 1995, pp. 1-23 (23 pages).
(Continued)

*Primary Examiner* — Jeffrey R Swearingen
(74) *Attorney, Agent, or Firm* — Wilmer Cutler Pickering Hale and Dorr LLP

(57) ABSTRACT

Systems and methods for retrieving regional content via remote access point servers are disclosed. In one embodiment, the disclosure relates to a network system for content retrieval from remote network regions. The network system may comprise a first device. The first device may be configured to receive a request for content. The content may be on one or more content servers located in a remote network region. The first device may be further configured to at least one of forwarding the request, via tunneling, to a destination access point server located in proximity to the one or more content servers and receiving the content from the destination access point server, obtaining the content from a cache of the first device.

20 Claims, 10 Drawing Sheets

Related U.S. Application Data

(60) Provisional application No. 62/174,394, filed on Jun. 11, 2015, provisional application No. 62/151,174, filed on Apr. 22, 2015, provisional application No. 62/144,293, filed on Apr. 7, 2015, provisional application No. 62/108,987, filed on Jan. 28, 2015, provisional application No. 62/100,406, filed on Jan. 6, 2015, provisional application No. 62/089,113, filed on Dec. 8, 2014.

(51) Int. Cl.
*H04N 21/61* (2011.01)
*H04L 9/40* (2022.01)
*G06F 15/16* (2006.01)
*H04N 21/858* (2011.01)
*H04N 21/845* (2011.01)
*H04L 61/4511* (2022.01)
*H04L 65/61* (2022.01)
*H04L 67/568* (2022.01)

(52) U.S. Cl.
CPC .......... *H04L 63/0281* (2013.01); *H04L 65/61* (2022.05); *H04L 67/568* (2022.05); *H04N 21/2183* (2013.01); *H04N 21/6125* (2013.01); *H04N 21/8456* (2013.01); *H04N 21/8586* (2013.01)

(56) References Cited

U.S. PATENT DOCUMENTS

| | | |
|---|---|---|
| 5,893,089 A | 4/1999 | Kikinis |
| 5,940,838 A | 8/1999 | Schmuck et al. |
| 6,209,039 B1 | 3/2001 | Albright et al. |
| 6,463,465 B1 | 10/2002 | Nieuwejaar |
| 6,477,166 B1 | 11/2002 | Sanzi et al. |
| 6,593,863 B2 | 7/2003 | Pitio |
| 6,611,587 B2 | 8/2003 | Brown et al. |
| 6,671,361 B2 | 12/2003 | Goldstein |
| 6,678,241 B1 | 1/2004 | Gai et al. |
| 6,690,223 B1 | 2/2004 | Wan |
| 6,735,207 B1 | 5/2004 | Prasad et al. |
| 6,879,995 B1 | 4/2005 | Chinta et al. |
| 6,973,048 B2 | 12/2005 | Pitio |
| 6,996,117 B2 | 2/2006 | Lee et al. |
| 7,006,505 B1 | 2/2006 | Bleszynski et al. |
| 7,039,701 B2 | 5/2006 | Wesley |
| 7,069,318 B2 | 6/2006 | Burbeck et al. |
| 7,145,882 B2 | 12/2006 | Limaye et al. |
| 7,145,922 B2 | 12/2006 | Pitio |
| 7,161,899 B2 | 1/2007 | Limaye et al. |
| 7,161,965 B2 | 1/2007 | Pitio |
| 7,173,902 B2 | 2/2007 | Daniell et al. |
| 7,177,929 B2 | 2/2007 | Burbeck et al. |
| 7,221,687 B2 | 5/2007 | Shugard |
| 7,224,706 B2 | 5/2007 | Loeffler-Lejeune |
| 7,254,833 B1 | 8/2007 | Cornelius et al. |
| 7,269,130 B2 | 9/2007 | Pitio |
| 7,310,348 B2 | 12/2007 | Trinh et al. |
| 7,349,403 B2 | 3/2008 | Lee et al. |
| 7,349,411 B2 | 3/2008 | Pitio |
| 7,349,435 B2 | 3/2008 | Giacomini |
| 7,389,312 B2 | 6/2008 | Ohran |
| 7,433,964 B2 | 10/2008 | Raguram et al. |
| 7,551,623 B1 | 6/2009 | Feroz et al. |
| 7,577,691 B2 | 8/2009 | Novik et al. |
| 7,587,487 B1 | 9/2009 | Gunturu |
| 7,633,909 B1 | 12/2009 | Jones et al. |
| 7,689,722 B1 | 3/2010 | Timms et al. |
| 7,742,405 B2 | 6/2010 | Trinh et al. |
| 7,742,411 B2 | 6/2010 | Trinh et al. |
| 7,801,030 B1 | 9/2010 | Aggarwal et al. |
| 7,822,877 B2 | 10/2010 | Chong et al. |
| 7,870,418 B2 | 1/2011 | Sekaran et al. |
| 7,886,305 B2 | 2/2011 | Ahmed et al. |
| 7,930,339 B2 | 4/2011 | Tobita et al. |
| 7,957,311 B2 | 6/2011 | Trinh et al. |
| 8,010,751 B2 | 8/2011 | Yang et al. |
| 8,064,909 B2 | 11/2011 | Spinelli et al. |
| 8,069,258 B1 | 11/2011 | Howell |
| 8,069,435 B1 | 11/2011 | Lai |
| 8,073,777 B2 | 12/2011 | Barry et al. |
| 8,107,363 B1 | 1/2012 | Saluja |
| 8,266,672 B2 | 9/2012 | Moore |
| 8,401,028 B2 | 3/2013 | Mihaly et al. |
| 8,422,397 B2 | 4/2013 | Ansari et al. |
| 8,437,641 B2 | 5/2013 | Lee et al. |
| 8,458,786 B1 | 6/2013 | Kailash et al. |
| 8,544,065 B2 | 9/2013 | Archer et al. |
| 8,611,335 B1 | 12/2013 | Wu et al. |
| 8,611,355 B1 | 12/2013 | Sella et al. |
| 8,625,411 B2 | 1/2014 | Srivivasan et al. |
| 8,769,057 B1 | 7/2014 | Breau et al. |
| 8,798,060 B1 | 8/2014 | Vautrin et al. |
| 8,861,344 B2 | 10/2014 | Trinh et al. |
| 8,874,680 B1 | 10/2014 | Das |
| 8,966,075 B1 | 2/2015 | Chickering et al. |
| 8,976,798 B2 | 3/2015 | Border et al. |
| 9,015,310 B2 | 4/2015 | Ochi |
| 9,038,151 B1 | 5/2015 | Chua et al. |
| 9,110,820 B1 | 8/2015 | Bent et al. |
| 9,164,702 B1 | 10/2015 | Nesbit et al. |
| 9,167,501 B2 | 10/2015 | Kempf et al. |
| 9,172,603 B2 | 10/2015 | Padmanabhan et al. |
| 9,213,594 B2 | 12/2015 | Strasser et al. |
| 9,241,004 B1 | 1/2016 | April |
| 9,253,028 B2 | 2/2016 | DeCusatis et al. |
| 9,277,452 B1 | 3/2016 | Aithal et al. |
| 9,294,304 B2 | 3/2016 | Sindhu |
| 9,298,719 B2 | 3/2016 | Noronha et al. |
| 9,350,644 B2 | 5/2016 | Desai et al. |
| 9,350,710 B2 | 5/2016 | Herle et al. |
| 9,351,193 B2 | 5/2016 | Raleigh et al. |
| 9,432,258 B2 | 8/2016 | Van Der Merwe et al. |
| 9,432,336 B2 | 8/2016 | Ostrowski |
| 9,450,817 B1 | 9/2016 | Bahadur et al. |
| 9,455,924 B2 | 9/2016 | Cicic et al. |
| 9,461,996 B2 | 10/2016 | Hayton et al. |
| 9,525,663 B2 | 12/2016 | Yuan et al. |
| 9,525,696 B2 | 12/2016 | Kapoor et al. |
| 9,544,137 B1 | 1/2017 | Brandwine |
| 9,565,117 B2 | 2/2017 | Dahod et al. |
| 9,569,587 B2 | 2/2017 | Ansari et al. |
| 9,590,820 B1 | 3/2017 | Shukla |
| 9,590,902 B2 | 3/2017 | Lin et al. |
| 9,641,612 B2 | 5/2017 | Yu |
| 9,699,001 B2 | 7/2017 | Addanki et al. |
| 9,699,135 B2 | 7/2017 | Dinha |
| 9,729,539 B1 | 8/2017 | Agrawal et al. |
| 9,858,559 B2 | 1/2018 | Raleigh et al. |
| 9,888,042 B2 | 2/2018 | Annamalaisami et al. |
| 9,898,317 B2 | 2/2018 | Nakil et al. |
| 10,044,678 B2 | 8/2018 | Van Der Merwe et al. |
| 10,061,664 B2 | 8/2018 | Verkaik et al. |
| 10,070,369 B2 | 9/2018 | Lynn, Jr. et al. |
| 10,078,754 B1 | 9/2018 | Brandwine et al. |
| 10,079,839 B1 | 9/2018 | Bryan et al. |
| 10,091,304 B2 | 10/2018 | Hoffmann |
| 10,237,253 B2 | 3/2019 | Chen |
| 10,331,472 B2 | 6/2019 | Wang |
| 10,574,482 B2 | 2/2020 | Ore et al. |
| 10,673,712 B1 | 6/2020 | Gosar et al. |
| 10,756,929 B2 | 8/2020 | Knutsen et al. |
| 10,841,360 B2 | 11/2020 | Rubenstein et al. |
| 10,904,201 B1 | 1/2021 | Ermagan et al. |
| 11,032,187 B2 | 6/2021 | Hassan |
| 2002/0007350 A1 | 1/2002 | Yen |
| 2002/0029267 A1 | 3/2002 | Sankuratripati et al. |
| 2002/0046253 A1 | 4/2002 | Uchida et al. |
| 2002/0049901 A1 | 4/2002 | Carvey |
| 2002/0087447 A1 | 7/2002 | McDonald et al. |
| 2002/0186654 A1 | 12/2002 | Tornar |
| 2003/0046529 A1 | 3/2003 | Loison et al. |

(56) References Cited

U.S. PATENT DOCUMENTS

| | | |
|---|---|---|
| 2003/0110214 A1 | 6/2003 | Sato |
| 2003/0147403 A1 | 8/2003 | Border et al. |
| 2003/0195973 A1 | 10/2003 | Savarda |
| 2003/0233551 A1 | 12/2003 | Kouznetsov et al. |
| 2004/0205339 A1 | 10/2004 | Medin |
| 2004/0268151 A1 | 12/2004 | Matsuda |
| 2005/0180319 A1* | 8/2005 | Hutnik .............. H04L 67/1021 370/237 |
| 2005/0203892 A1 | 9/2005 | Wesley et al. |
| 2005/0208926 A1 | 9/2005 | Hamada |
| 2005/0235352 A1 | 10/2005 | Staats et al. |
| 2006/0020793 A1 | 1/2006 | Rogers et al. |
| 2006/0031407 A1 | 2/2006 | Dispensa et al. |
| 2006/0031483 A1 | 2/2006 | Lund et al. |
| 2006/0047944 A1 | 3/2006 | Kilian-Kehr |
| 2006/0075057 A1 | 4/2006 | Gildea et al. |
| 2006/0179150 A1 | 8/2006 | Farley et al. |
| 2006/0195896 A1 | 8/2006 | Fulp et al. |
| 2006/0225072 A1 | 10/2006 | Lari et al. |
| 2007/0112812 A1 | 5/2007 | Harvey et al. |
| 2007/0165672 A1 | 7/2007 | Keels et al. |
| 2007/0168486 A1 | 7/2007 | McCoy et al. |
| 2007/0168517 A1 | 7/2007 | Weller et al. |
| 2007/0226043 A1 | 9/2007 | Pietsch et al. |
| 2008/0010676 A1 | 1/2008 | Dosa Racz et al. |
| 2008/0043742 A1 | 2/2008 | Pong et al. |
| 2008/0091598 A1 | 4/2008 | Fauleau |
| 2008/0117927 A1 | 5/2008 | Donhauser et al. |
| 2008/0130891 A1 | 6/2008 | Sun et al. |
| 2008/0168377 A1 | 7/2008 | Stallings et al. |
| 2008/0240121 A1 | 10/2008 | Xiong et al. |
| 2008/0247386 A1 | 10/2008 | Wildfeuer |
| 2008/0256166 A1 | 10/2008 | Branson et al. |
| 2008/0260151 A1 | 10/2008 | Fluhrer et al. |
| 2008/0301794 A1 | 12/2008 | Lee |
| 2009/0003223 A1 | 1/2009 | McCallum et al. |
| 2009/0092043 A1 | 4/2009 | Lapuh et al. |
| 2009/0100165 A1 | 4/2009 | Wesley, Sr. et al. |
| 2009/0106569 A1 | 4/2009 | Roh et al. |
| 2009/0122990 A1 | 5/2009 | Gundavelli et al. |
| 2009/0129386 A1 | 5/2009 | Rune |
| 2009/0132621 A1 | 5/2009 | Jensen et al. |
| 2009/0144416 A1 | 6/2009 | Chatley et al. |
| 2009/0144443 A1 | 6/2009 | Vasseur et al. |
| 2009/0193428 A1 | 7/2009 | Dalberg et al. |
| 2009/0213754 A1 | 8/2009 | Melamed |
| 2009/0217109 A1 | 8/2009 | Sekaran et al. |
| 2009/0259798 A1 | 10/2009 | Wang et al. |
| 2010/0017603 A1 | 1/2010 | Jones |
| 2010/0131616 A1 | 5/2010 | Walter et al. |
| 2010/0316052 A1 | 12/2010 | Petersen |
| 2010/0325309 A1 | 12/2010 | Cicic et al. |
| 2011/0007652 A1 | 1/2011 | Bai |
| 2011/0185006 A1 | 7/2011 | Raghav et al. |
| 2011/0231917 A1 | 9/2011 | Chaturvedi et al. |
| 2011/0247063 A1 | 10/2011 | Aabye et al. |
| 2011/0268435 A1 | 11/2011 | Mizutani et al. |
| 2011/0314473 A1 | 12/2011 | Yang et al. |
| 2012/0005264 A1 | 1/2012 | McWhirter et al. |
| 2012/0005307 A1 | 1/2012 | Das et al. |
| 2012/0082057 A1 | 4/2012 | Welin et al. |
| 2012/0105637 A1 | 5/2012 | Yousefi et al. |
| 2012/0158882 A1 | 6/2012 | Oehme et al. |
| 2012/0179904 A1 | 7/2012 | Dunn et al. |
| 2012/0185559 A1 | 7/2012 | Wesley, Sr. et al. |
| 2012/0188867 A1 | 7/2012 | Fiorone et al. |
| 2012/0196646 A1 | 8/2012 | Crinon et al. |
| 2012/0210417 A1 | 8/2012 | Shieh |
| 2012/0270580 A1 | 10/2012 | Anisimov et al. |
| 2013/0110787 A1 | 5/2013 | Garimella et al. |
| 2013/0173900 A1 | 7/2013 | Liu |
| 2013/0247167 A1 | 9/2013 | Paul et al. |
| 2013/0259465 A1 | 10/2013 | Blair |
| 2013/0283118 A1 | 10/2013 | Rayner |
| 2013/0286835 A1 | 10/2013 | Plamondon et al. |
| 2013/0287037 A1 | 10/2013 | Bush et al. |
| 2013/0308471 A1 | 11/2013 | Krzanowski et al. |
| 2013/0318233 A1 | 11/2013 | Biswas et al. |
| 2013/0322255 A1 | 12/2013 | Dillon |
| 2013/0343180 A1 | 12/2013 | Kini et al. |
| 2014/0020942 A1 | 1/2014 | Cho et al. |
| 2014/0071835 A1 | 3/2014 | Sun et al. |
| 2014/0086253 A1 | 3/2014 | Yong |
| 2014/0101036 A1 | 4/2014 | Phillips et al. |
| 2014/0149552 A1 | 5/2014 | Carney et al. |
| 2014/0169214 A1 | 6/2014 | Nakajima |
| 2014/0181248 A1 | 6/2014 | Deutsch et al. |
| 2014/0210693 A1 | 7/2014 | Bhamidipati et al. |
| 2014/0215059 A1 | 7/2014 | Astiz Lezaun et al. |
| 2014/0226456 A1 | 8/2014 | Khan et al. |
| 2014/0229945 A1 | 8/2014 | Barkai et al. |
| 2014/0237464 A1 | 8/2014 | Waterman et al. |
| 2014/0250066 A1 | 9/2014 | Calkowski et al. |
| 2014/0269712 A1 | 9/2014 | Kidambi |
| 2014/0278543 A1 | 9/2014 | Kasdon |
| 2014/0280911 A1 | 9/2014 | Wood et al. |
| 2014/0289826 A1 | 9/2014 | Croome |
| 2014/0310243 A1 | 10/2014 | McGee et al. |
| 2014/0337459 A1 | 11/2014 | Kuang et al. |
| 2014/0341023 A1 | 11/2014 | Kim et al. |
| 2014/0359704 A1 | 12/2014 | Chen |
| 2014/0369230 A1 | 12/2014 | Nallur |
| 2015/0006596 A1 | 1/2015 | Fukui et al. |
| 2015/0063117 A1 | 3/2015 | DiBurro et al. |
| 2015/0063360 A1 | 3/2015 | Thakkar et al. |
| 2015/0089582 A1 | 3/2015 | Dilley et al. |
| 2015/0095384 A1 | 4/2015 | Antony et al. |
| 2015/0128246 A1 | 5/2015 | Feghali et al. |
| 2015/0222637 A1 | 8/2015 | Hung et al. |
| 2015/0248434 A1 | 9/2015 | Avati et al. |
| 2015/0271104 A1 | 9/2015 | Chikkamath et al. |
| 2015/0281176 A1 | 10/2015 | Banfield |
| 2015/0326588 A1 | 11/2015 | Vissamsetty et al. |
| 2015/0363230 A1 | 12/2015 | Kasahara et al. |
| 2016/0006695 A1 | 1/2016 | Prodoehl et al. |
| 2016/0028586 A1 | 1/2016 | Blair |
| 2016/0028770 A1 | 1/2016 | Raleigh et al. |
| 2016/0055323 A1 | 2/2016 | Stuntebeck et al. |
| 2016/0077745 A1 | 3/2016 | Patel et al. |
| 2016/0105530 A1 | 4/2016 | Shribman et al. |
| 2016/0117277 A1 | 4/2016 | Raindel et al. |
| 2016/0119279 A1 | 4/2016 | Maslak et al. |
| 2016/0127492 A1 | 5/2016 | Malwankar et al. |
| 2016/0134543 A1 | 5/2016 | Zhang et al. |
| 2016/0165463 A1 | 6/2016 | Zhang |
| 2016/0226755 A1 | 8/2016 | Hammam et al. |
| 2016/0261575 A1 | 9/2016 | Maldaner |
| 2016/0285977 A1 | 9/2016 | Ng et al. |
| 2016/0308762 A1 | 10/2016 | Teng et al. |
| 2016/0330736 A1 | 11/2016 | Polehn et al. |
| 2016/0337223 A1 | 11/2016 | Mackay |
| 2016/0337484 A1 | 11/2016 | Tola |
| 2016/0364158 A1 | 12/2016 | Narayanan et al. |
| 2016/0366233 A1 | 12/2016 | Le et al. |
| 2017/0063920 A1 | 3/2017 | Thomas et al. |
| 2017/0078922 A1 | 3/2017 | Raleigh et al. |
| 2017/0105142 A1 | 4/2017 | Hecht et al. |
| 2017/0201556 A1 | 7/2017 | Fox et al. |
| 2017/0230821 A1 | 8/2017 | Chong et al. |
| 2017/0344703 A1 | 11/2017 | Ansari et al. |
| 2018/0013583 A1 | 1/2018 | Rubenstein et al. |
| 2018/0024873 A1 | 1/2018 | Milliron et al. |
| 2018/0091417 A1 | 3/2018 | Ore et al. |
| 2018/0198756 A1 | 7/2018 | Dawes |
| 2020/0382341 A1 | 12/2020 | Ore et al. |
| 2021/0044453 A1 | 2/2021 | Knutsen et al. |
| 2021/0342725 A1 | 11/2021 | Marsden et al. |
| 2021/0345188 A1 | 11/2021 | Shaheen |

FOREIGN PATENT DOCUMENTS

| | | |
|---|---|---|
| CN | 1536824 A | 10/2004 |
| CN | 1754161 A | 3/2006 |
| CN | 1829177 A | 9/2006 |

(56) References Cited

FOREIGN PATENT DOCUMENTS

| | | | | |
|---|---|---|---|---|
| CN | 101079896 | A | 11/2007 | |
| CN | 101282448 | A | 10/2008 | |
| CN | 101478533 | A | 7/2009 | |
| CN | 101599888 | A | 12/2009 | |
| CN | 101765172 | A | 6/2010 | |
| CN | 101855865 | A | 10/2010 | |
| CN | 101969414 | A | 2/2011 | |
| CN | 102006646 | A | 4/2011 | |
| CN | 102209355 | A | 10/2011 | |
| CN | 102340538 | A | 2/2012 | |
| CN | 102457539 | A | 5/2012 | |
| CN | 102687480 | A | 9/2012 | |
| CN | 102739434 | | 10/2012 | |
| CN | 103118089 | A | 5/2013 | |
| CN | 103384992 | A | 11/2013 | |
| CN | 103828297 | A | 5/2014 | |
| CN | 102255794 | B | 7/2014 | |
| CN | 104320472 | A | 1/2015 | |
| EP | 1498809 | A1 | 1/2005 | |
| EP | 1530761 | A2 | 5/2005 | |
| EP | 1635253 | A2 | 3/2006 | |
| EP | 2154834 | A1 | 2/2010 | |
| EP | 2357763 | A1 | 8/2011 | |
| WO | WO-02/33551 | A1 | 4/2002 | |
| WO | WO-2003025709 | A2 | 3/2003 | |
| WO | WO-03/041360 | A2 | 5/2003 | |
| WO | WO-2003/090018 | A2 | 10/2003 | |
| WO | WO-2003088047 | A1 | 10/2003 | |
| WO | WO-2003090017 | A2 | 10/2003 | |
| WO | WO-2006/055838 | A2 | 5/2006 | |
| WO | WO-2008/058088 | A1 | 5/2008 | |
| WO | WO-2008/067323 | A2 | 6/2008 | |
| WO | WO-2010/072030 | A1 | 7/2010 | |
| WO | WO-2012100087 | A2 | 7/2012 | |
| WO | WO-2013/120069 | A1 | 8/2013 | |
| WO | WO-2015/021343 | A1 | 2/2015 | |
| WO | WO-2016073361 | A1 * | 5/2016 | ............ H04L 61/20 |
| WO | WO-2016/094291 | A1 | 6/2016 | |
| WO | WO-2016/110785 | A1 | 7/2016 | |
| WO | WO-2016/123293 | A1 | 8/2016 | |
| WO | WO-2016/162748 | A1 | 10/2016 | |
| WO | WO-2016/162749 | A1 | 10/2016 | |
| WO | WO-2016/164612 | A1 | 10/2016 | |
| WO | WO-2016/198961 | A2 | 12/2016 | |

OTHER PUBLICATIONS

Extended European Search Report dated Sep. 7, 2018 received in related European Patent Application No. 16744078.3 (7 pages).

Robert Russell, "Introduction to RDMA Programming," retrieved from the Internet: URL:web.archive.org/web/20140417205540/http://www.cs.unh.edu/~rdr/rdma-intro-module.ppt (76 pages).

"Open Radio Equipment Interface (ORI); ORI Interface Specification; Part 2: Control and Management (Release 4)," Group Specification, European Telecommunications Standards Institute (ETSI), 650, Route des Lucioles; F-06921 Sophia-Antipolis; France, vol. ORI, No. V4.1.1, Oct. 1, 2014 (185 pages).

Office Action, dated Mar. 13, 2020, received in related Chinese Patent Application No. 201680021239.4 (9 pages).

Supplementary Partial European Search Report, dated May 20, 2019, for European Patent Application No. 16872483.9 (8 pages).

Office Action, dated Jun. 3, 2020, for Chinese Patent Application No. 201680066545.X (with English translation) (11 pages).

Office Action, dated May 7, 2020, for Chinese Patent Application No. 201680020878.9 (7 pages).

Szeto, W et al., "A multi-commodity flow based approach to virtual network resource allocation," GLOBECOM' 03. IEEE Global Telecommunications Conference (IEEE Cat. No. 03CH37489), San Francisco, CA, USA, 2003, pp. 3004-3008, vol. 6, doi: 10.1109/GLOCOM.2003.1258787, 2003 (5 pages).

Figueiredo, R. J., "Social VPNs: Integrating Overlay and Social Networks for Seamless P2P Networking," 2008 IEEE 17th Workshop on Enabling Technologies: Infrastructure for Collaborative Enterprises, Rome, Italy, 2008, pp. 93-98, doi: 10.1109/WETICE.2008.43, 2008 (6 pages).

Baumgartner, A., "Mobile core network virtualization: A model for combined virtual core network function placement and topology optimization," Proceedings of the 2015 1st IEEE Conference on Network Softwarization (NetSoft), London, UK, 2015, pp. 1-9, doi: 10.1109/NETSOFT, 2015 (9 pages).

Chen, Y., "Resilient Virtual Network Service Provision in Network Virtualization Environments," 2010 IEEE 16th International Conference on Parallel and Distributed Systems, Shanghai, China, 2010, pp. 51-58, doi: 10.1109/ICPADS.2010.26., 2010 (8 pages).

Examination Report, dated Oct. 19, 2018, for European Patent Application No. 16727220.2 (11 pages).

Definition of "server" in Microsoft Computer Dictionary, 2002, Fifth Edition, Microsoft Press (3 pages).

Definition of "backbone" in Microsoft Computer Dictionary, 2002, Fifth Edition, Microsoft Press (2 pages).

Examination Report, dated Jul. 20, 2017, for Chinese Application No. 201680004969.3 (1 page).

Examination Report, dated Aug. 2, 2018, for European Patent Application No. 16734942.2 (8 pages).

International Search Report and Written Opinion, dated Dec. 28, 2016, for International Application No. PCT/IB2016/001161 (7 pages).

International Search Report and Written Opinion, dated May 11, 2017, for International Application No. PCT/IB2016/001867 (13 pages).

Extended European Search Report, dated Aug. 2, 2018, for European Patent Application No. 15866542.2 (8 pages).

Examination Report, dated Mar. 5, 2020, for Chinese Patent Application No. 201580066318.2, (10 pages).

International Search Report and Written Opinion, dated Dec. 7, 2015, for International Application No. PCT/US2015/064242 (9 pages).

Extended Search Report, dated Nov. 29, 2018, for European Patent Application No. 16806960.7 (10 pages).

Office Action, dated Mar. 12, 2020, for Chinese Patent Application No. 201680032657.3 (5 pages).

International Search Report and Written Opinion, dated Jun. 7, 2016, for International Application No. PCT/IB2016/000110 (8 pages).

International Search Report and Written Opinion, dated Apr. 8, 2016, for International Application No. PCT/US2016/015278 (9 pages).

Extended European Search Report, dated Sep. 7, 2018, for European Patent Application No. 16777297.9 (4 pages).

International Search Report and Written Opinion, dated Aug. 10, 2016, for International Application No. PCT/IB2016/000531 (20 pages).

International Search Report and Written Opinion, dated Sep. 23, 2016, for International Application No. PCT/IB2016/000528 (11 pages).

Examination Report, dated Mar. 3, 2020, for Chinese Application No. 201680020937.2 (9 pages).

Long Gong, Yonggang Wen, Zuqing Zhu, and Tony Lee, "Revenue-Driven Virtual Network Embedding Based on Global Resource Information", Globecom 2013, Next Generation Networking Symposium, pp. 2294-2299. (Year: 2013) (6 pages).

Soroush Haeri, Qingye Ding, Zhida Li, and Ljiljana Trajkovic, "Global REsource Capacity Algorithm with Path Splitting for Virtual Network Embedding", 2016 IEEE, pp. 666-669. (Year: 2016) (4 pages).

N.M. Mosharaf Kabir Chowdhury, Muntasir Raihan Rahman, and Raouf Boutaba, "Virtual Network Embedding with Coordinated Node and Link Mapping", IEEE Communications Society Subject Matter Experts for Publication in the IEEE INFOCOM 2009, pp. 783-791. (Year: 2009) (9 pages).

International Search Report and Written Opinion, dated Sep. 1, 2017, for International Application No. PCT/IB2017/000613 (7 pages).

(56) References Cited

OTHER PUBLICATIONS

International Search Report and Written Opinion, dated Aug. 23, 2017, for International Application No. PCT/IB2017/000580 (6 pages).
International Search Report and Written Opinion, dated Jul. 28, 2017, for International Application No. PCT/IB2017/000557 (6 pages).
International Search Report and Written Opinion, dated Jul. 7, 2016, for International Application No. PCT/US2016/026489 (7 pages).
Supplementary European Search Report, dated Dec. 11, 2019, for European Patent Application No. 17788882.3 (8 pages).

\* cited by examiner

SYSTEM AND METHOD FOR CONTENT RETRIEVAL FROM REMOTE NETWORK REGIONS

This application is a continuation of U.S. patent application Ser. No. 15/533,958, entitled "System and Method for Content Retrieval from Remote Network Regions," filed Jun. 7, 2017, which is a U.S. National Stage application under 35 U.S.C. § 371 of International Patent Application No. PCT/US2015/064242, filed Dec. 7, 2015, which claims the benefit of and priority to U.S. Provisional Application No. 62/089,113 filed on Dec. 8, 2014; U.S. Provisional Application No. U.S. 62/100,406 filed on Jan. 6, 2015; U.S. Provisional Application No. 62/108,987 filed on Jan. 28, 2015; U.S. Provisional Application No. 62/144,293 filed on Apr. 7, 2015; U.S. Provisional Application No. 62/151,174 filed on Apr. 22, 2015; and U.S. Provisional Application No. 62/174,394 filed on Jun. 11, 2015, all of which are herein incorporated by reference in their entireties.

FIELD OF THE DISCLOSURE

The present disclosure relates generally to networks, and more particularly, to retrieving regional content via remote access point servers.

BACKGROUND OF THE DISCLOSURE

Within the internet's client-server topology, the further the distance from client to server, the higher the latency or round trip time (RTT) between the two and the slower the fulfillment and delivery of a data request. The number of hops across intermediary network devices between the client and the server is defined as hop count and is subject to an Internet Protocol limit of time-to-live (TTL) also known as a hop limit which defines the maximum number of allowed hops before a packet is dropped as undeliverable. This TTL limit is imposed to prevent congestion due to unrouteable packets that would otherwise loop through the internet indefinitely clogging the pipes. When making connections over long distances, this safety mechanism can also cause problems for deliverable packets. As a packet transits a hop an integer of one is subtracted from the TTL. Once the TTL hits zero, then the packet will be dropped. Therefore even if the path is good, if it has too many hops, then it will still be rendered undeliverable.

Content delivery networks (CDN) were developed to bring cloned copies of content from distant servers to be hosted on and served from CDN servers as close to the requesting client as possible. These CDN servers offer a significant performance increase, as what used to be remotely hosted data is now cached on servers at locations in close proximity to the requesting client. The shorter the distance, the lower the latency and fewer hops, the faster content will be delivered. Where content is globally equivalent (the same everywhere), this represents a desired performance gain.

In the case of content which differs by region but is available via the same universal resource locator (URL) which automatically sends traffic to client devices based on a geo-location mechanism such as a map marker, this can represent a problem as only content from the region where the request is made is served. However, the end user might desire content to be served from a different geographic location.

To get content from another region, some users manually force traffic through public proxies or proxy servers but this practice is limiting for a number of reasons. It can be slow and is usually insecure because in most cases, the user does not control the proxy servers that their traffic transits through. This method usually needs to be manually configured. It is point-to-point such that that they have to execute/retrieve code on one region, then reconfigure the proxy client to retrieve content from a different proxy server in another region, and so on. Not only is this time consuming but it is not advantageous as they are not able to concurrently view content from more than one region. There is no control over the network path taken between client and proxy server and between proxy server and target content server. This can also result in slow speeds and low bandwidth.

Soft VPN's can also be utilized for this purpose but there is no control over the network in the middle and like proxy servers, these need to be configured to be used per region as it these are only point-to-point.

In view of the foregoing, it may be understood that there may be significant need to allow for multiple, concurrent secure and fast streams to multiple regions with low latency and hop count.

SUMMARY OF THE DISCLOSURE

Systems and methods for retrieving regional content via remote access point servers are disclosed. In one embodiment, the disclosure relates to a network system for content retrieval from remote network regions. The network system may comprise a first device. The first device may be configured to receive a request for content. The content may be on one or more content servers located in a remote network region. The first device may be further configured to at least one of forwarding the request, via tunneling, to a destination access point server located in proximity to the one or more content servers and receiving the content from the destination access point server, obtaining the content from a cache of the first device.

In accordance with other aspects of this embodiment, the destination access point server is configured to pull the content from the one or more content servers.

In accordance with other aspects of this embodiment, between the first device and the destination access point server, the network system further comprise one or more intermediate tunnels connecting one or more intermediate access pointer servers and one or more intermediate routing devices.

In accordance with other aspects of this embodiment, at least one of the intermediate access point servers and the destination access point server is configured to perform a Domain Name System (DNS) lookup to locate the one or more content servers.

In accordance with other aspects of this embodiment, at least one of the intermediate routing devices, the first device, the intermediate access point servers, and the destination access point server is configured to perform a Domain Name System (DNS) lookup from a cache to locate the one or more content servers.

In accordance with other aspects of this embodiment, at least one of the intermediate routing devices, the intermediate access point servers, and the destination access point server is configured to cache the content.

In accordance with other aspects of this embodiment, the cached content is synchronized across the intermediate routing devices, the first device, the intermediate access point servers, and the destination access point server.

In accordance with other aspects of this embodiment, at least one of the intermediate routing devices, the first device, the intermediate access point servers, and the destination access point server is configured to at least one of compressing the content and decompressing the content.

In accordance with other aspects of this embodiment, at least one of the intermediate routing devices and the first device is configured to perform smart routing based on a global virtual network.

In accordance with other aspects of this embodiment, the smart routing is based on at least one of best bandwidth, lowest latency, fewest hops, and no packet loss.

In accordance with other aspects of this embodiment, the smart routing is based on at least one of real-time statistics and historical statistics.

In accordance with other aspects of this embodiment, the destination access point server is further configured to pull the content from the one or more content servers simultaneously. In accordance with other aspects of this embodiment, the content from the one or more content server comprises one or more links to additional content as constituent parts.

In accordance with other aspects of this embodiment, the destination content server is further configured to pull content from the one or more links.

In accordance with other aspects of this embodiment, the content of the one or more links is pulled from a remote region in which content of a page containing the one or more links is located.

In accordance with other aspects of this embodiment, the destination access point server is further configured to pull the content from the one or more links simultaneously.

In accordance with other aspects of this embodiment, the content may be validated.

In accordance with other aspects of this embodiment, the validation is based on at least one of file size check and hash check.

In another embodiment, the disclosure relates to a method for content retrieval from remote network regions. According to the method, a request for content may be received by a first device. The content may be on one or more content servers located in a remote network region. The request may be forwarding, via tunneling, to a destination access point server located in proximity to the one or more content servers and the content from the destination access point server may be received. The content may be obtained from a cache of the first device.

In still another embodiment, the disclosure relates to a non-transitory computer readable medium storing a computer-readable program of content retrieval from remote network region. The program may include computer-readable instructions to receive, by the first device, a request for content. The content may be on one or more content servers located in a remote network region; The program may include computer-readable instructions to forward the request, via tunneling, to a destination access point server located in proximity to the one or more content servers and receiving the content from the destination access point server. The program may include computer-readable instructions to obtain the content from a cache of the first device.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

In some embodiments, regional content retrieval disclosed herein uses a combination of smart-routing, tunnels through the topology of the mesh of devices of a Global Virtual Network (GVN) to reach Access Point Servers (SRV_AP) in target geographic locations, content pulling agents working with content delivery agents, chained caching and other embodiments which allow a host (client) to specify a desired region to fetch content from and to receive content from there as if they were physically located in that region. Advanced smart routing and point to multi-point topology also offer the advantages of concurrent streams from multiple remote regions defined by source host (client) or target host (server) or target URL, or other.

In some embodiments, each request may be routed to a geographic destination of their choosing via a Content Delivery Agent (CDA) located on an end-point device (EPD) in close proximity to them. The content from multiple target geographic regions is simultaneously served to them as an independent stream per request from an SRV_AP server in the region where the desired content is located on a host (server) via content pulling agent (CPA) running on their behalf. An SRV_AP server may also pull content from multiple content servers simultaneously. To improve performance and increase speed, content fetched files and streams can be sent either as individual files or clumps of combined files via chained caches. Send back control and input interactions between CDA to CPA for execution and data stream flow manipulation with delivery of fetched content served by the CDA on the EPD from local cache.

In some embodiments, traffic flow through a GVN to an SRV_AP with CPA in close proximity to the target content server in the desired geographic location. Data traffic flows through chained caches transmitted via secure, advanced smart routing (ASR) of wrapped and obfuscated tunnels through SRV_AP and then to a CDA on the EPD which originally made the request for content.

In some embodiments, a device in the system disclosed herein may receive and/or intercept what would otherwise be a pass-through request for content.

The FIGS. 1-5 illustrate how the internet works without and with content delivery networks (CDN) delivering content from Host Servers to Host Clients. There are advantages to CDN's but where content differs by region, some serious limitations need to be overcome. This background information is to provide background perspective on why techniques disclosed herein can provide a better, more robust quality of service (QoS).

Figure 1:
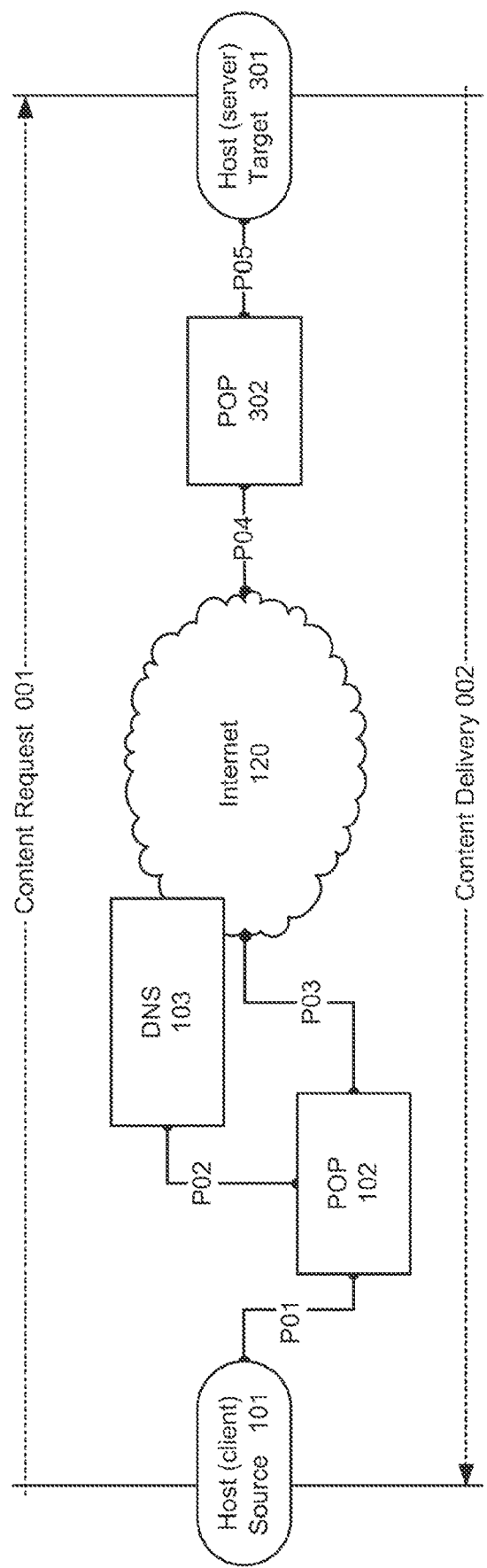
FIG. 1 shows a block diagram depicting resolution of universal resource locator (URL) via lookup through internet domain name system (DNS) for routing from Host (client) to the numeric IP address of the Host (server).

FIG. 1 shows a block diagram depicting resolution of universal resource locator (URL) via lookup through internet domain name system (DNS) for routing from Host (client) to the numeric IP address of the Host (server). A content request or push from host client (C) 101 to host server (S) 301 as files or streams or blocks of data flows in the direction of 001. The response 002 of content delivery from host S to host C as files or streams or blocks of data. The host client device 101 in Client-Server (C-S) relationship that makes request to access content from a remote host S or sends data to remote host S via a universal resource locator (URL) or other network reachable address.

The connection from the host client to the internet is marked as P01—connection from client 101 to POP 102 directly facing or can be located in a local area network (LAN) which then connects to the internet via a point of presence (POP) can be referred to as the last mile connection. The point of presence (POP) 102 which represents connection provided from an end point by an internet service provider (ISP) to the internet via their network and its interconnects. If the URL is a domain name rather than a numeric address, then this URL is sent to domain name system (DNS) server 103 where the domain name is translated to an IPv4 or IPv6 or other address for routing purposes.

Traffic from client 101 to server 301 is routed through the Internet 120 representing transit between POPs (102 and 302) including peering, backhaul, or other transit of network boundaries.

The connection P02 from POP 102 to DNS 103 to look up a number address from a universal resource locator (URL) to get the IPv4 address or other numeric address of target server can be directly accessed from the POP 102, or via the Internet 120. The connection P03 from POP 102 of an ISP to the Internet 120 can be single-honed or multi-honed. There is a connection P04 from the Internet 120 to the ISP's or internet data center's (IDC) internet-facing POP 302. The connection P05 from the POP 302 of the server to the host 301 can be direct or via multiple hops.

The lookups from name to numeric address via domain name systems is a standard on the Internet today and assumes that the DNS server is integral and that its results are current and can be trusted.

Figure 2:
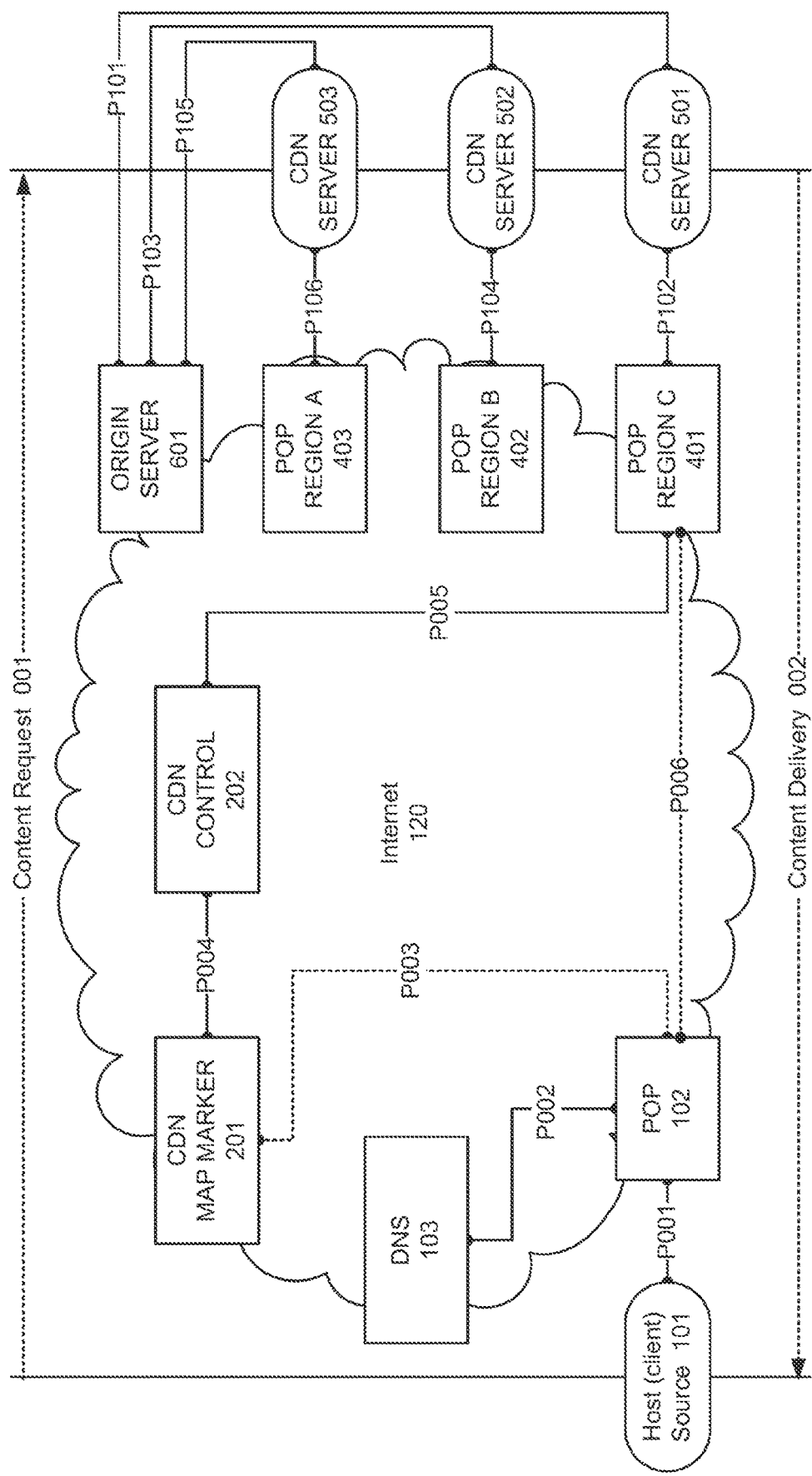
FIG. 2 shows a block diagram depicting CDN resolution and content delivery where content is globally equivalent.

FIG. 2 shows a block diagram depicting CDN resolution and content delivery where content is globally equivalent. FIG. 2 includes various network paths (e.g., P001, P002, etc.) Content Delivery Networks (CDN) can offer significant advantages in speed and flexibility and load balancing when serving content to clients. Content requests 001 flow from host client (C) 101 to host server (S) and the reply 002 flow of content delivery returns from host S to host C as packetized files or streams or blocks of data.

The host client 101, can be a device such as a laptop, desktop computer, phone, tablet, or other device that acts as a client in a Client-Server (CS) relationship. It makes request(s) to access content served by a remote host server via a universal resource locator (URL).

The POP 102, DNS server 103, Internet 120 operate in the same manner as noted in FIG. 1.

In the case of CDN infrastructure, CDN Map Markers 201 in coordination with CDN control server(s) 202 or similar mechanisms determine which region the client device is located in and which CDN server to connect to for content to be served.

If the client 101 is in Region A, it will be routed to the CDN server 503 in Region A via server's POP 403 in Region A. And clients 101 in Region B will connect to a CDN server 502 in Region B via server's POP 402 in Region B. And clients 101 in Region C will connect to a CDN server 501 in Region C via server's POP 401 in Region C.

In this example, there is a content equivalency for all served content and each CDN server of 501, 502 and 503 has an exact cloned copy of content from the Origin Server 601.

When content is globally equivalent, i.e. same content served on CDN Servers from Regions A, B, and C, then it will be equally replicated from an origin server 601 which feeds the content servers.

The initial CDN Map Marker 201 lookup via the P001 via 102 to P003 may be very quick or could take a relatively high lookup time if the CDN Map Marker server is located in a region far from the client device. Once the lookup is done, traffic will flow to the nearest and or best available CDN Server via P006.

For the sake of illustration of this figure, a region is defined as a geographic area which is different from another geographic area. It does not necessarily represent a great area but could be so and it also could represent a great distance from one region to another or they could be very close to each other. The key point is that clients in one region are to receive content via a CDN server from a specific region and not from another region.

Figure 3:
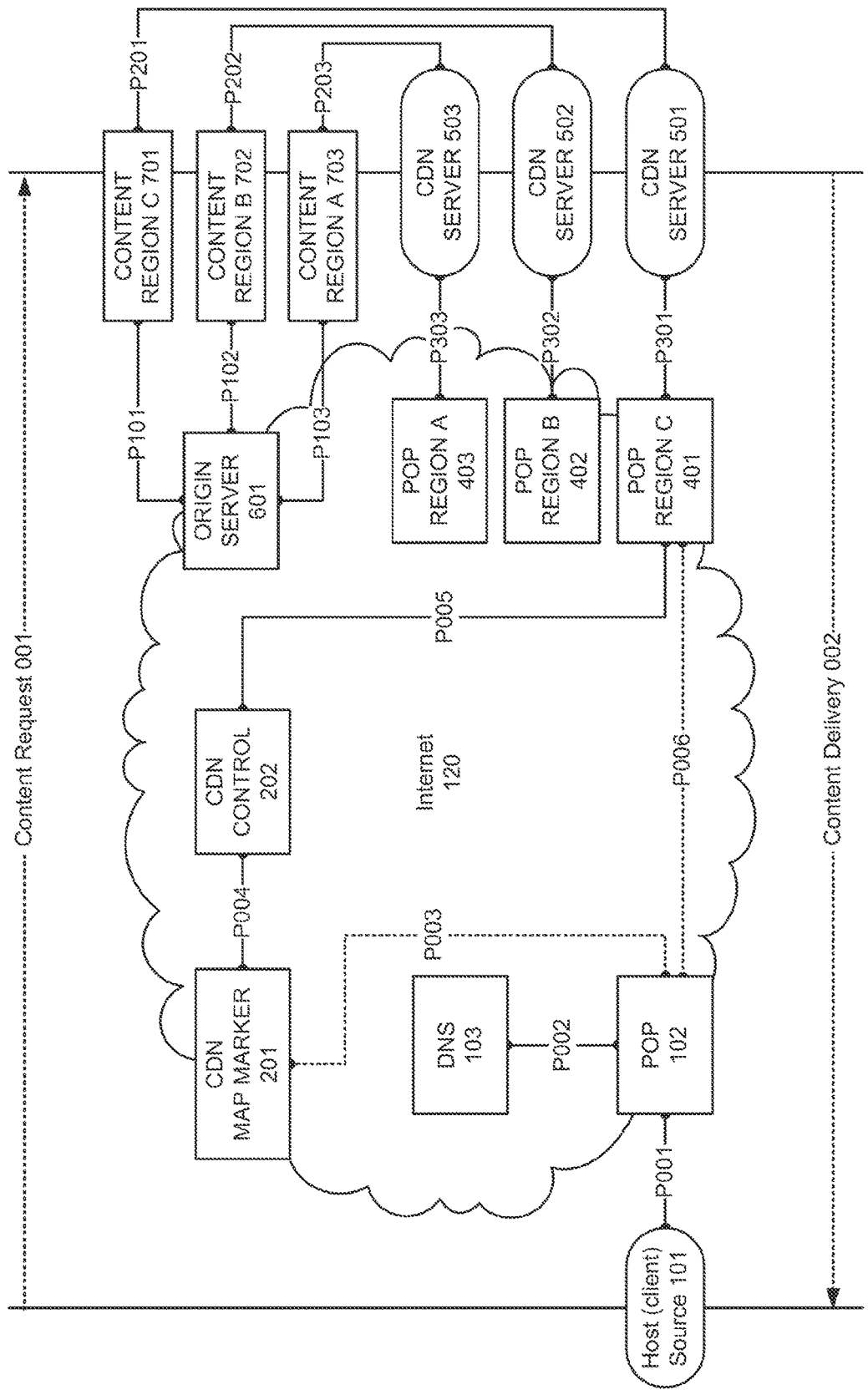
FIG. 3 shows a block diagram depicting CDN resolution and delivery of regionally specific content.

FIG. 3 shows a block diagram depicting CDN resolution and delivery of regionally specific content. FIG. 3 includes various network paths (e.g., P001, P002, etc.) FIG. 3 is similar to FIG. 2, with the main difference between them is that the content for each region is different from the content of other regions. Between CDN servers 501, 502, and 503 and the Origin Server 601 are Content Regional Servers 701, 702, and 703 which publish the regionally specific content to CDN servers in each region to be served to clients in their respective regions.

Figure 4:
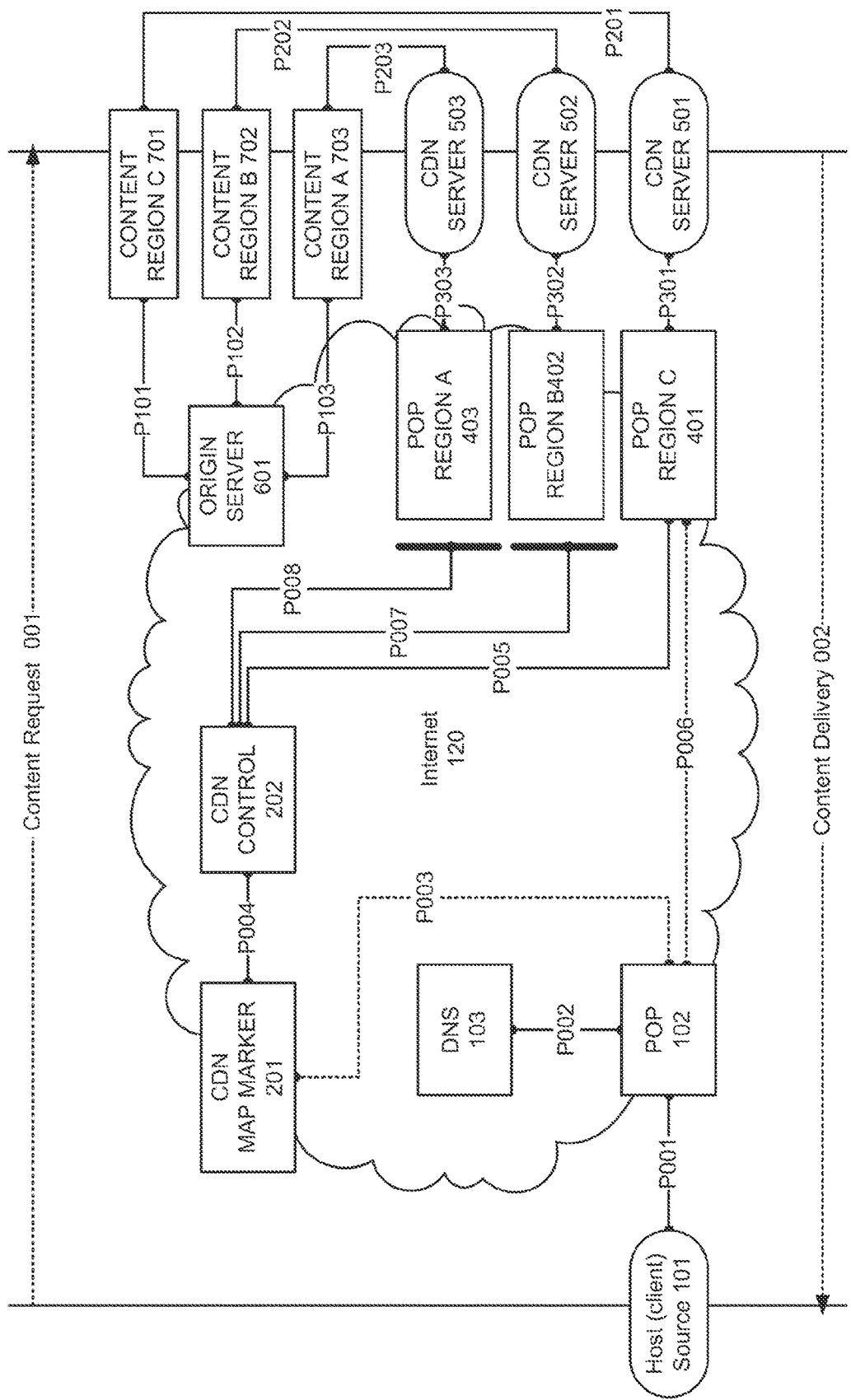
FIG. 4 shows a block diagram depicting CDN resolution and delivery of regionally specific content with explicit blocking.

FIG. 4 shows a block diagram depicting CDN resolution and delivery of regionally specific content with explicit blocking. FIG. 4 includes various network paths (e.g., P001, P002, etc.) When a client 101 in one region wants content served by a server 502 or 503 from another region, no matter what they do, they will only be served content from the server 501 in their region. They cannot access other content even if they try to force it to connect to the content server in the region from where they desire to receive content. They keep being served content from their region without choice. Local DNS lookup 103 resolves with IP pointing only to their region's CDN server 501. This may be due to a Global IP address which maps to only a CND in their region (if global IP) or another reason. The result is that the client could be geo-blocked at path P007 or path P008.

Normal connection via path P005 based on current geographic location is not subject to blocking and traffic flows so that Host (client) 101 receives content for that geographic location via server 501.

For target regions 502 and 503 that are different from the current geographic location, traffic is stopped at path P007 and/or path P008 and Host (client) is denied content from the remote geographic destination(s). They may be forced to server in their current location 501 or receive nothing or an error message or just undesired content depending on the configuration and policy of the CDN control system 202.

Figure 5:
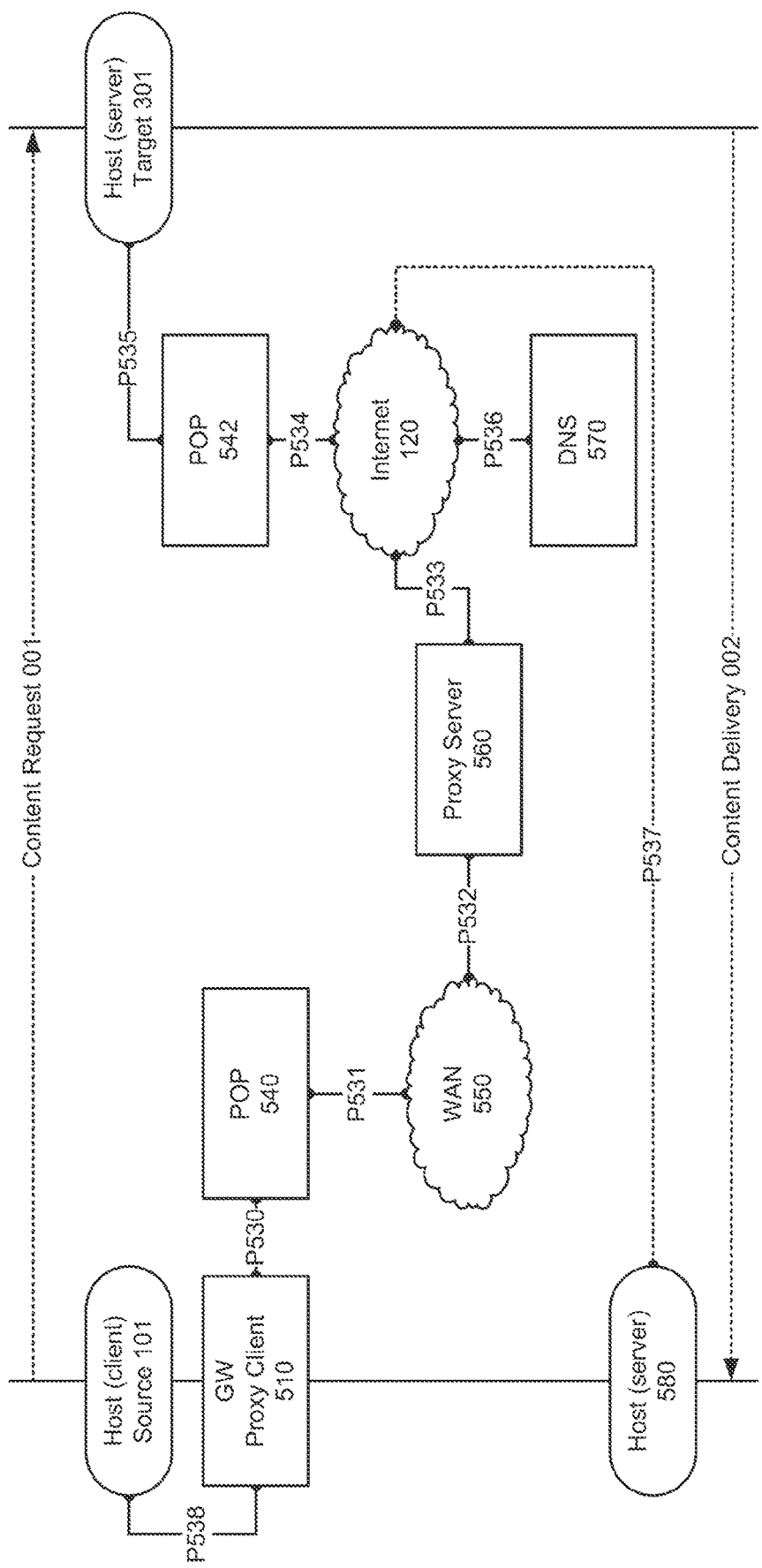
FIG. 5 shows a block diagram depicting how a proxy server works.

FIG. 5 shows a block diagram depicting how a proxy server works. Content request or push 001 flow from host client (C) 101 to host server (S) 301 and may comprise packetized files or streams or blocks of data. Content delivery 001 flow from target host 301 to client host 101 and may comprise packetized files or streams or blocks of data.

Client 101, a client device in Client-Server (CS) relationship makes request to access content from a remote host, a server via a universal resource locator (URL) or numeric IP address or other.

This request goes through a GW device running proxy client software 510 running on the host client 101. This proxy client connects to a Proxy Server via tunnel, encrypted or unencrypted via path P530 from GW510 to point of presence (POP) 540 and then over the Internet as a part of a WAN 550 to path P532 to the Proxy Server in remote region. The traffic egresses from the proxy server 560 via path P533 into the open internet 120 and connect to host server 103 in target region via P534 through POP 542 and via P535.

The host server views the traffic as coming from the IP address and geographic of the proxy server. If this IP is in the same region as defined by the server in the target region, the desired content will be served. To aid in this localization, proxy servers will usually connect to DNS servers 570 in the same region as the proxy server is located.

To address the issues and limitations described in FIG. 1 through FIG. 5, the FIGS. 6 through 9 illustrate the operations of geographic destination and some of its possible applications. There are more possibilities for which this mechanism and these methods can be applied.

Figure 6:
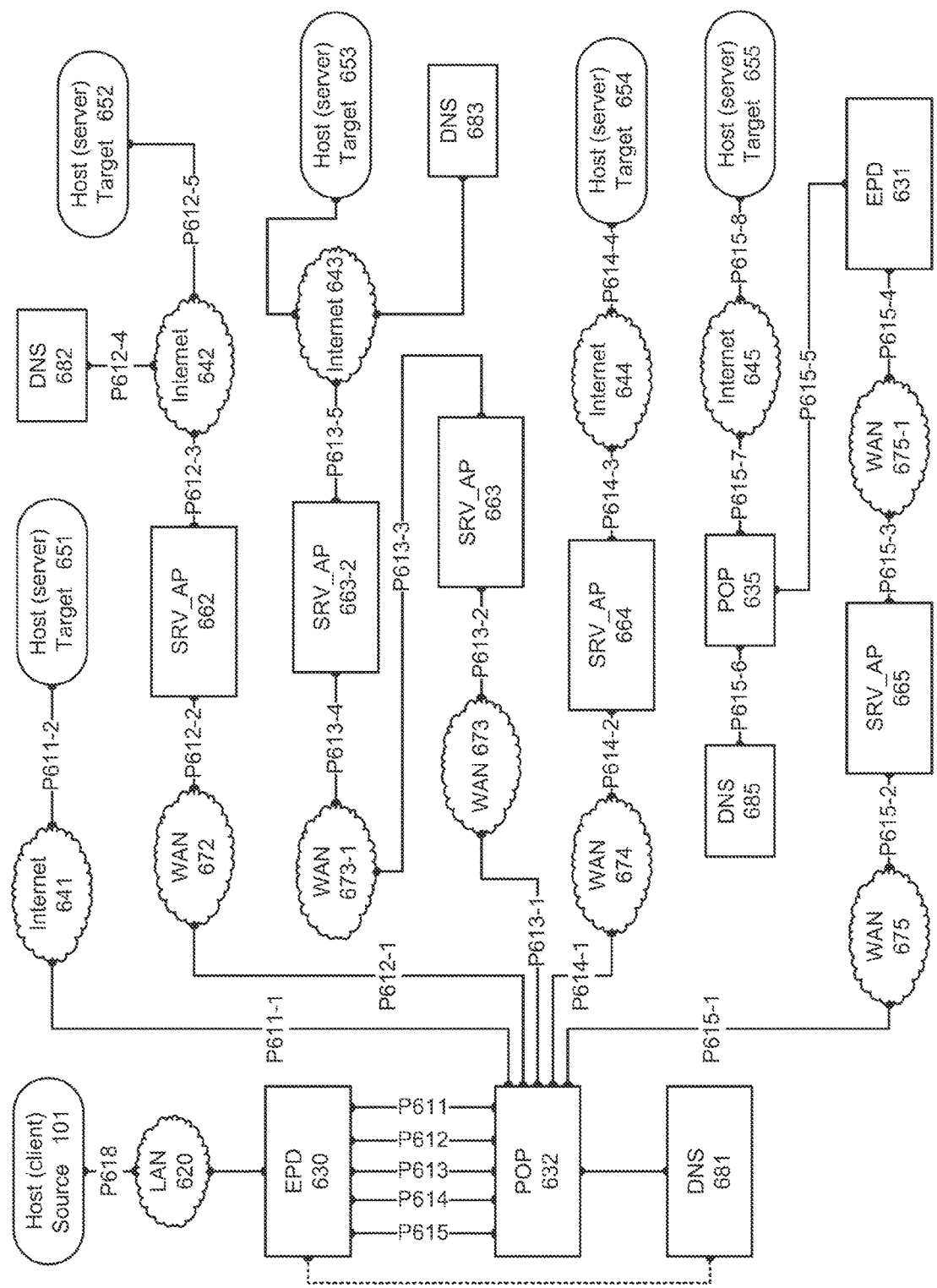
FIG. 6 shows a block diagram illustrating geographic destination DNS resolution and content delivery via a Global Virtual Network (GVN) in accordance with an embodiment of the present disclosure.

FIG. 6 shows a block diagram illustrating geographic destination DNS resolution and content delivery via a Global Virtual Network (GVN) in accordance with an embodiment of the present disclosure. In some embodiments, Advanced-Smart-Routing within an endpoint device routes traffic via connections either directly to the Internet for local connections or via tunnels to a global virtual network (GVN) and its mesh of servers and other devices. Content retrieval from content servers in target regions may be realized via various paths. FIG. 6 demonstrates various possible paths to illustrate some of the functionality of the techniques disclosed herein.

In some embodiments, the host client 101 connects through P618 to a local area network 620 and from there to an end point device 630. Smart routing within the EPD routes traffic through one of multiple tunnels P611 through P615 to a point of presence (POP) 632. These paths may flow through the pop as follows:

P611 connects through the POP 632 to P611-1 and through the internet 641 via path P611-2 to a host server 651 in the same target region as the host client 101. This example may be for accessing a content or CDN server in very close proximity to the location of the host client which does not go through the GVN.

P612 is a secure tunnel which connects through POP 632 to an access point server (SRV_AP) 662 via path P612-1, WAN 672 and path P612-2. A Content Pulling Agent (CPA) at SRV_AP 662 may perform DNS lookups at DNS 682 through P612-3 and via internet 642 and path P612-4. When the CPA on SRV_AP 662 receives the numeric address result of the lookup, it requests content from host server 652 via P612-5.

P613 is a secure tunnel which behaves in the same manner as P612 (e.g., P613-1, P613-2, and WAN 673) and achieves similar results with the only difference between them is that the tunnel connects to the first SRV_AP 663 and then through another tunnel P613-3 to WAN 673-1 to P613-4 to a second SRV_AP 663-2 and from there to retrieve content from host target server 653 with DNS lookup from DNS 683 and through Internet 693 in much the same way as SRV_AP 662 operates.

P614 is a secure tunnel which behaves in the same manner as P612 (e.g., P614-1, P614-2, P614-3, P614-4, WAN 674, SRV_AP 664, Internet 644, Target 654). The difference is that DNS lookup is from a cache within the EPD 630. From there, advanced smart routing sends the traffic down to SRV_AP 664 to retrieve content from host server 654, without a DNS lookup in target region.

P615 is a secure tunnel P615-1 bridged through WAN 675 to P615-2 to SRV_AP 665 where within the SRV_AP 665 it bridges to another tunnel P615-3 through WAN 675-1 to P615-4 where the tunnel completes a secure bridge to EPD 631. Traffic egresses from the EPD 631 via P615-5 to a POP 635 in the target region. DNS lookups are made from the POP 635 to DNS server 685 via P615-6. DNS lookup may also be made via lookup in cache of EPD 631 or through internet 645 to another DNS server in that region or another location. Content from host server 655 is pulled through P615-8 to internet 645 to pop 635 to EPD 631 for sending back to EPD 630. In some embodiment, EPD 631 may send cached contents to EPD 630. In other embodiments, EPD 631 may pull contents from Host 655.

Figure 7:
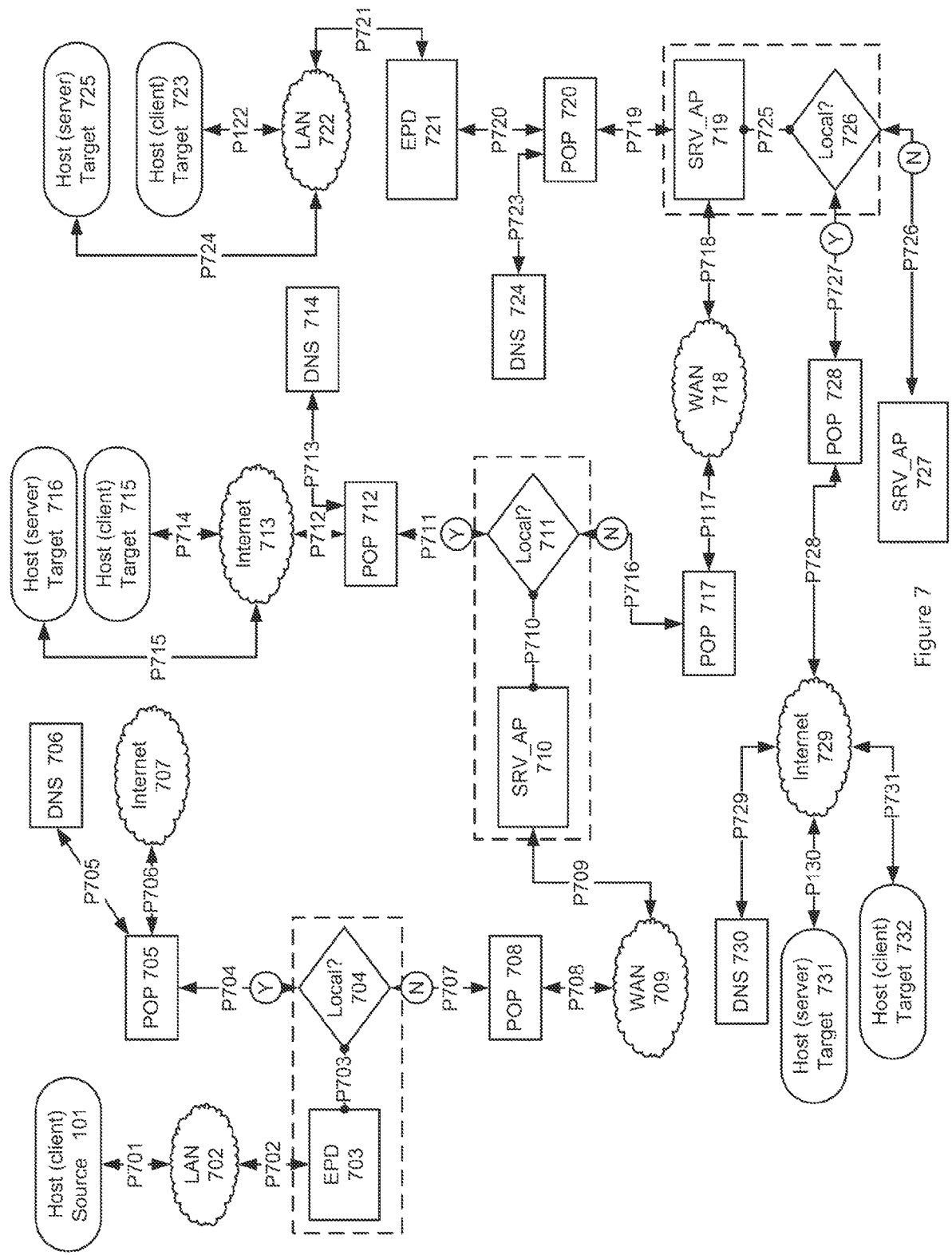
FIG. 7 shows a flowchart of Advanced Smart Routing (ASR) within a GVN in accordance with an embodiment of the present disclosure.

FIG. 7 shows a flowchart of Advanced Smart Routing (ASR) within a GVN in accordance with an embodiment of the present disclosure. FIG. 7 illustrates how Advanced Smart Routing (ASR) operates within a Global Virtual Network. FIG. 7 includes various LANs (e.g., 702, 704), Internet (e.g., 707, 729), SRV_APs (e.g., 710, 719), POPs (e.g., 728, 717), WANs (e.g., 118), client (e.g, 101, 716), EPD (703, 721), DNS (e.g, 714, 706), and paths (P701-P731).

From the starting point of a host client device 101 in a local area network (LAN) 702 connected to an end point device (EPD) 703, the GVN may offer the EPD 703 a multitude of connection paths to multiple potential termination points. This is a flowchart of a high level view of the routing logic a packet could take as it transits a GVN utilizing ASR for optimal performance. From the perspective of the host client 101, their traffic will flow through an internet protocol (IP) network with as few number of hops and best possible latency at the third layer of the GVN. The first layer of the GVN is the base internet with automatic configuration of a construct of virtual interfaces, tunnels, routing and other networking policies. The second layer of the GVN is where the algorithms, software and logic to govern operation between layer three and layer one.

The first main routing decision is at a logic gate 704 within the EPD 703 where traffic either egresses to the local Internet 707 where the EPD 703 is located via path P704 or if it is to go through a secure wrapped and obfuscated tunnel via P707 to the access point server (SRV_AP) 710 offering the best connectivity to the region where SRV_AP 710 is located. Prior to traffic egressing SRV_AP 710, it passes through a routing logic gate 711. Traffic to egress locally to the Internet 713 will go via path P711 to either a host client 715 or a host server 716 there. If traffic is not local but rather to be relayed to another region, it will go via path P716 through a tunnel P718 to the next SRV_AP 719.

At SRV_AP 719, three of many possible routing options are illustrated by the paths that traffic can take. There may be a logic gate 726 to determine if traffic should remain and egress to the local Internet 729 and then to target 731/732 and possibly via DNS lookup at 730 or if it should go through a tunnel via P726 to a SRV_AP 727 in another region. Another possibility is illustrated via path P719 which demonstrates a tunnel from SRV_AP 719 to another EPD 721 in a distant region. This is an EPD 703 to EPD 721 connected via multiple bridged tunnels.

A further possibility is for traffic to reach client devices 725/723 in the LAN 722 where EPD 721 is located through the EPD's connection P721.

Figure 8:
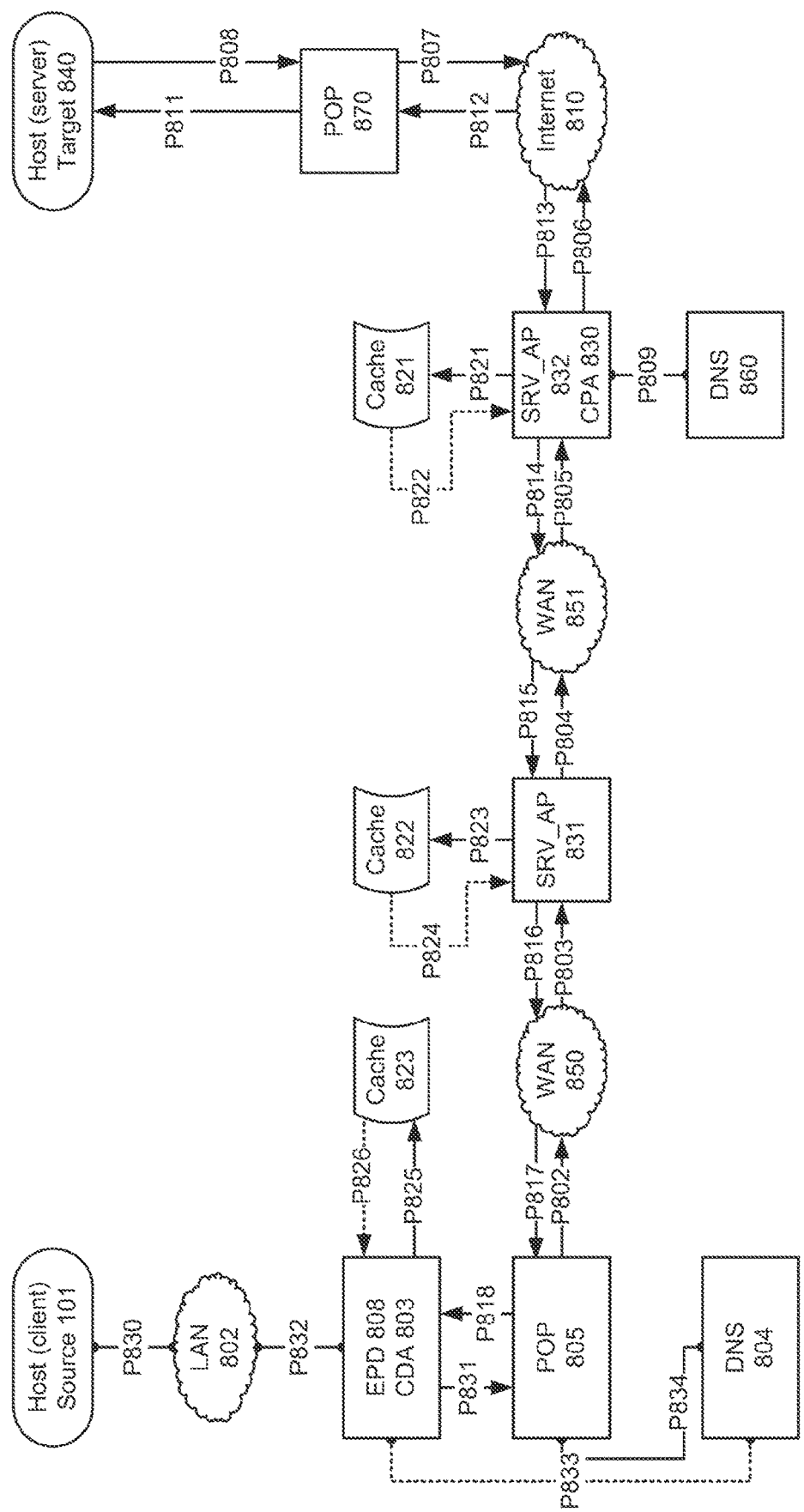
FIG. 8 shows a block diagram illustrating the geographic destination mechanism (GDM) within a GVN in accordance with an embodiment of the present disclosure.

FIG. 8 shows a block diagram illustrating the geographic destination mechanism within a GVN in accordance with an embodiment of the present disclosure. The Geographic Destination Mechanism describes a system utilizing the advantages offered by a GVN overlaid on top of the internet. It is a system of secure tunnels, smart routed via access point servers to an egress point in another region to fetch remote content as if the requesting client was geo-located in that region. FIG. 8 includes various paths (e.g., P802-P818, P821-P826, and P830-P834), cache (e.g., 821-823), SRV_AP (e.g, 831 and 832), WANs (e.g., 850 and 851), Internet (e.g., 810), DNS (e.g., 804, 860), POP (e.g., 870), client 101 and host target 840.

The GVN connects devices from within LAN 802 to distant host servers 803 or clients on either the internet 810 or within another LAN. One advantage of the GVN is that it may allow a distant device to pull data files and streams from servers in remote regions as if the client was located in that region. This advantage overcomes limitation of inefficient routing, geo-blocking, too many hops, or other problems on the open internet. Advanced Smart Routing (ASR) ensures that the most optimal path through the GVN is taken and chained caches 821/822/823 working in lockstep or coordination with Content Delivery Agents (CDA) 803 requesting data from Content Pulling Agents (CPA) 830 pull data into access point servers (SRV_AP) 832 and make this data available for delivery as soon as possible.

In this embodiment, when a host client 101 wants to fetch content from host server 840 in the target region, it may do a domain name systems (DNS) lookup from DNS 804 or query its geographic destination DNS cache within the CDA to convert the uniform resource locator (URL) into a numeric address. From this numeric IP address, ASR routes traffic to the SRV_AP 832 closest to the target content.

The EPD 808 makes a tunnel P802 to WAN 850 to P803 to first SRV_AP 831 which connects to the destination SRV_AP 832 via a second tunnel P804 to WAN 851 to P805. The CPA 830 will connect to the host server 840 to fetch the content. Where this content is a web page, the CPA 830 will download the content and parse it to make a list of links from which to pull content as files and streams (from multitude of sources). Many websites today serve images, files, content, video streams and other content from many different servers. The URL links for this content need to be indexed and the CPA will do DNS lookups from DNS server 860 for all URLs in that region.

The CPA 830 will fetch and cache content into a cache 821 attached to the SRV_AP 832. The content in the cache can be either as individual files or a glob of files or a combination of both.

The content may be synchronized on the fly from cache 821 to the cache 822 on SRV_AP 831 in middle region between region of host server 840 and region of EPD 803 and host client 103. From the cache 822, the content may be synchronized on the fly to cache 823 at location of EPD 803. Once the content is in the EPD 803, it can either be accessible by host client 101 connecting to the EPD 803 via LAN 802 or direct connect. In other embodiment, the synchronization of the content among the caches may be scheduled.

In some embodiments, the geographic destination mechanism disclosed herein retrieves content from a distant region as if the requesting client was in that region with DNS lookups for that content and all of the associated streams done in that region.

In some embodiments, the retrieving of content files and streams from a powerful SRV_AP in a multi-honed data center in close proximity to the host servers is able to rapidly retrieve data into the SRV_AP.

In some embodiments, the Content Pulling Agent 830 fetches content items, caches them, and combines them into an amalgamation or glob or clump of files. This can be compressed and efficiently transmitted back to EPD 803.

In some embodiments, chained caches relay data on the fly. In some embodiments, SRV_APs such as 831 and 832 are connected via large pipes via international backhaul. In some embodiments, multiple SRV_APs are connected. By breaking a long round trip path into a series of paths connected to each other, data transmission throughput can be boosted.

In some embodiments, the Global Virtual Network to route traffic via the most efficient route and tunnels as possible. In some implementations, efficient routing may be based on real-time statistics. In other implementations, efficient routing may be based on historical statistics.

Figure 9:
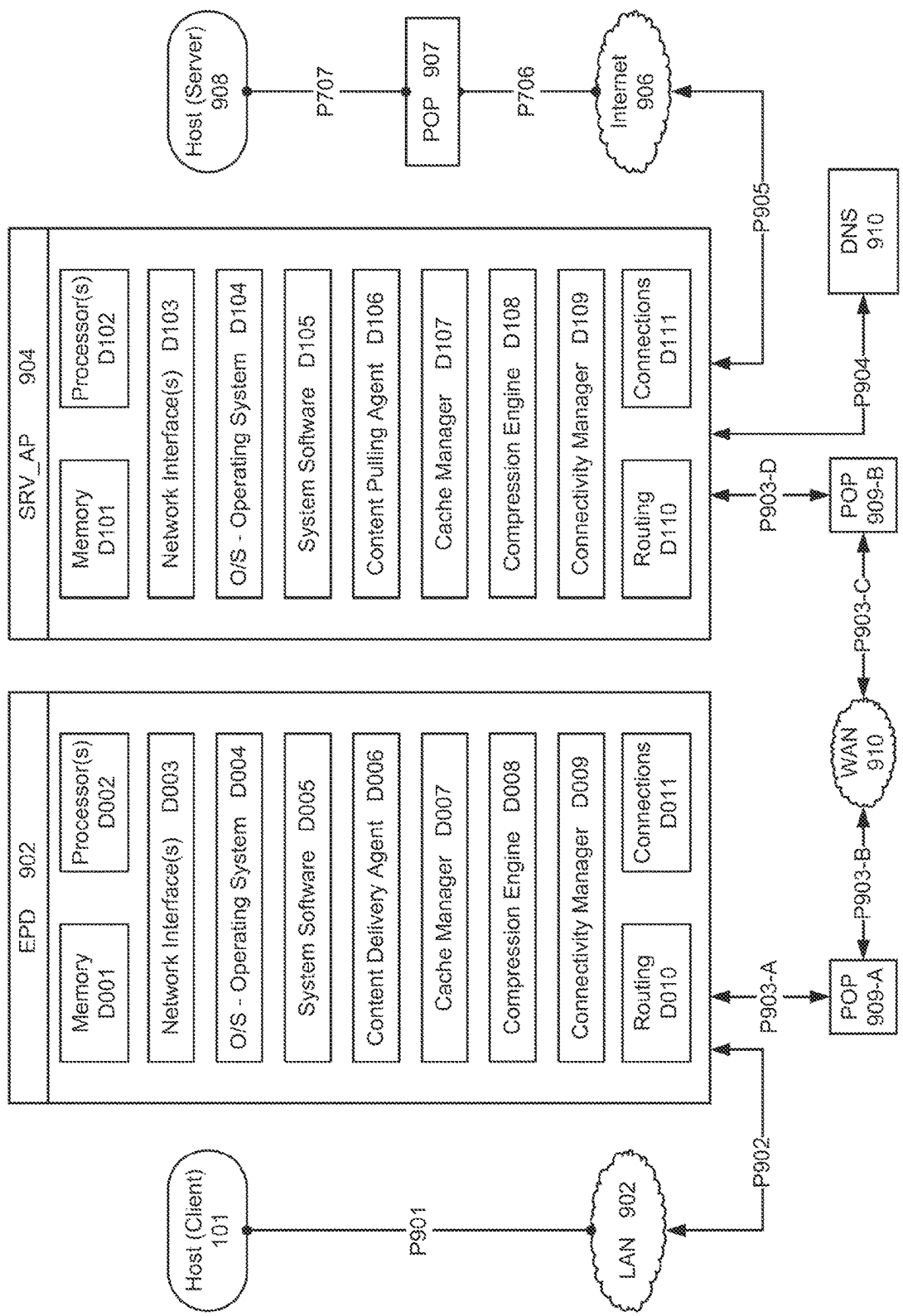
FIG. 9 shows a block diagram illustrating software architecture of end point device and access point server connected within a GVN in accordance with an embodiment of the present disclosure.

FIG. 9 shows a block diagram illustrating software architecture of end point device and access point server connected within a GVN in accordance with an embodiment of the present disclosure. As shown in FIG. 9, the software and hardware can be distributed within the network devices and across different circuit boards, processors, network interface cards, and memory.

An end-point device (EPD) 902 and an access point server (SRV_AP) 904 may be connected to each other via secure tunnels described by communication path P903-A to a point of presence (POP) 909-A, by communication path P903-B through a WAN 910 to communication path P903-C to POP 909-B to communication path P903-D.

The software architecture of EPD 902 and SRV_AP 904 may be similar with the differentiation by role of each device. EPD 902 may have a Content Delivery Agent (CDA) D006 and the SRV_AP 904 may have a Content Pulling Agent (CPA) D106.

The lowest level of each device, the Memory D001/D101 and Processors D002/D102 and the network interfaces D003/D103 may be on the hardware level. The operating system (O/S) D004/D104 may be a LINUX system or equivalent system such as Debian or other. The operating system D004/D104 may include packages and configuration for routing, hosting, communications and other system level operations.

A system software layer D005/D105 of the Global Virtual Network's (GVN's) operational systems may be present on top of the operating system. The system software layer D005/D105 may include custom commands, system modules and other constituent parts operating here, as well as other components of the GVN. Each type of device of the GVN may have some or all of these portions of the system software layer depending on their role.

On the EPD 902, content delivery agent D006 may act as a middle man between the requesting client and the content pulling agent D106 on the remote SRV_AP 904. Communication between content delivery agent D006 and content pulling agent D106 may be processed by cache manager D007/D107, compression engines D008/D108, connectivity manager D009/D109 which may include routing D0010/D1010 and connections D011/D111 and other modules and related software. The flow of information between them may egress the EPD 902 via path P903-A, or the SRV_AP 904 via path P903-D.

On the SRV_AP 904, in addition to communicating to host servers 908, the content delivery agent D106 may perform DNS lookups in the target region from DNS 910 (via path P904).

In some embodiments, the cache manager D007/D107 may check that data is replicated between caches in either direction. The cache manager D007/D107 may also check the replicated data is an integral, exact cloned copy. The cache manager D007/D107 may also flush old content to ensure that its memory & storage does not become too bloated and that it also operates at maximum efficiency. The compression engine D008/D108 will either compress or decompress data depending on traffic flow.

In some embodiments, the connectivity manager D009/D109 manage a construct of virtual interfaces (VIF), tunnels, aggregations of tunnels, network bridges and other elements related to connectivity between devices of the GVN.

In some embodiments, the routing manager D010/D110 may ensure that packets flow through the appropriate VIF, tunnel or egress to the open internet.

In some embodiments, the connections manager D011/D111 may continually test, build, destroy, link and perform other operations on tunnels and various connections between devices of the GVN.

In some embodiments, EPD 902 communicates with client 101 through LAN 902, via paths P901 and P902. SRV_AP 904 may communicate with host server 904 through Internet 906 and POP 907 via paths P905, P906, and P907.

Figure 10:
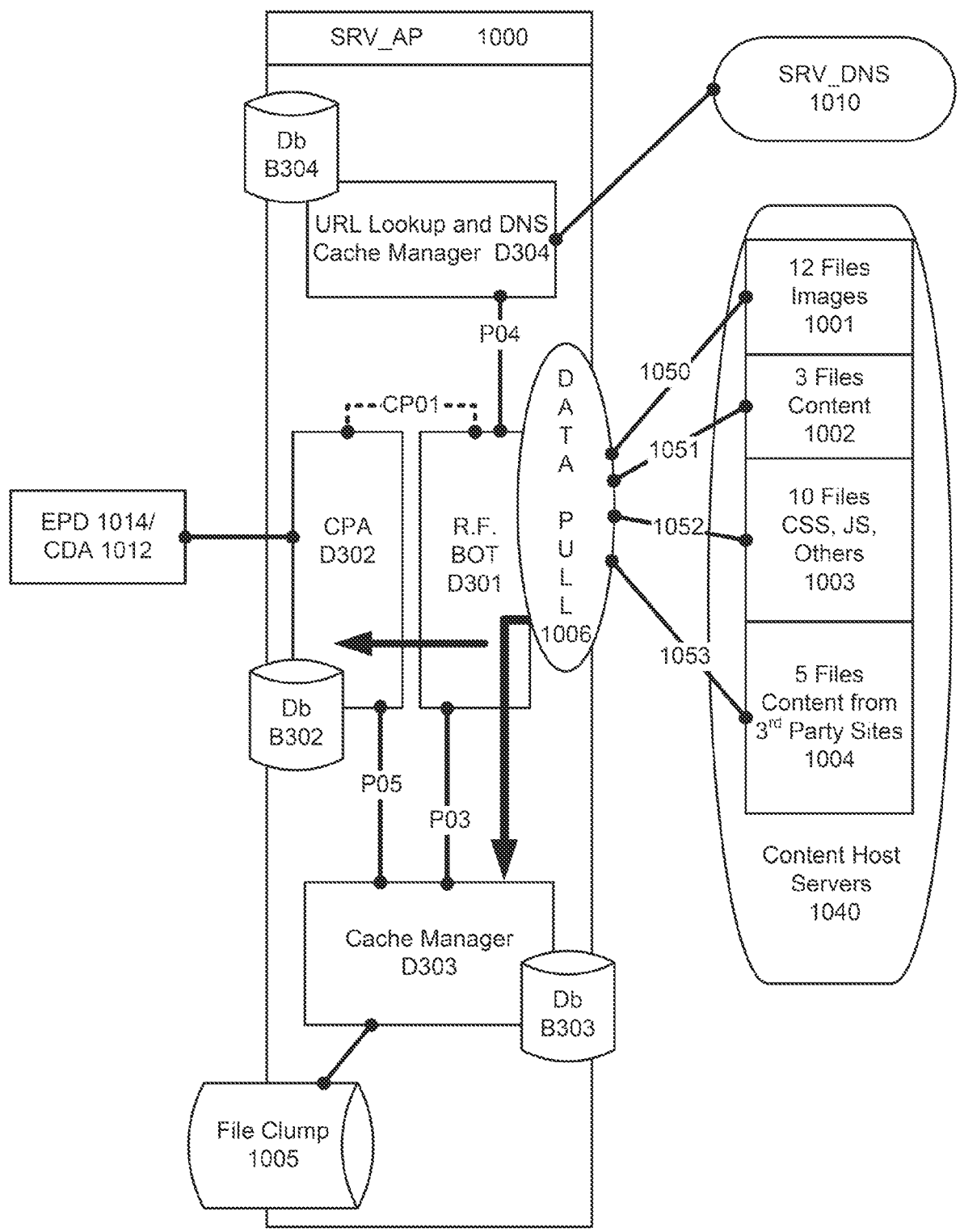
FIG. 10 shows a block diagram illustrating operation of the access point server in accordance with an embodiment of the present disclosure.

FIG. 10 shows a block diagram illustrating operation of the access point server in accordance with an embodiment of the present disclosure.

In some embodiments, the content pulling agent (CPA) D302 resides on the SRV_AP 1000. The CPA D302 may receive the target URL/URI from the content delivery agent 1012 located on EPD 1014. By way of example, this target address that the client wishes to reach is located in another region from the client and is where the client wishes to pull content from.

The CPA D302 may pass the request address to the remote fetcher bot (R.F.BOT) D301. R.F.BOT D301 may perform the DNS lookup and then to use that information to put content via data pull 1006. In some embodiments, the DNS information is cached in the cache manager D304 through database B304. In other embodiments, the DNS information may be fetched from a DNS server, such as 1010.

The R.F.BOT D301 may work in conjunction with CPA D302 to parse the fetched results via CP01 to seek any other addresses for auxiliary content which can and should be pulled as constituent parts of that content.

The content may comprise images 1001, text files 1002, files 1003 in various format such as CSS, JS, and other formats, files 1004 from $3^{rd}$ party sites. The content may reside on content host server 1040. The content may reside on more than one content server. Requests may be stored in database D302 for access and future reference by CPA D302 and R.F.BOT D301.

In some embodiments, each content stream 1050/1051/1052/1053 may be pulled in parallel.

In some embodiments, content from data pull 1006 may be passed to CPA D302 and stored in database B302. In other embodiments, contents from data pull 1006 may be passed to cache manager D303 and stored in database B303. The cached content may be transferred either as a file clump 1005 or as separate files.

Depending on distance from origin to geographic destination region, the file type and QoS, the pulled files in the cache may be clumped into one single file for unified transfer through the chained cache or as individual files which may be sent in parallel, concurrent streams.

The various content files may also be clumped together into one large file—so instead of for example 30 data files individually controlled and transported over a large distance, it would be only one file, but that file as multiple streams. And then it is unclumped at the EPD side and served again as 30 files The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method comprising:
    building, by one or more hardware processors, a plurality of tunnels coupled to a corresponding plurality of servers each associated with a different geographic region;
    receiving, by the one or more hardware processors, a request for content from a client device;
    identifying, by the one or more hardware processors, a target geographic region associated with the request;
    selecting, by the one or more hardware processors, a first tunnel among the plurality of tunnels, the first tunnel being coupled to a first server among the plurality of servers, the first server being associated with the target geographic region;

forwarding the request, by the one or more hardware processors, to the first server via the first tunnel;

receiving, by the one or more hardware processors, via the first tunnel, content associated with the request; and delivering, by the one or more hardware processors, the content to the client device.

2. The method of claim 1, wherein the first server is configured to aggregate the content from one or more content servers located within the target geographic region.

3. The method of claim 1, wherein the plurality of tunnels are coupled to the corresponding plurality of servers through a shared point of presence (POP) associated with a geographic region of client device.

4. The method of claim 1, wherein the content is received as an aggregate file associated with a plurality of separate content files.

5. The method of claim 4, further comprising de-aggregating the aggregate file to obtain the plurality of separate content files, wherein the content is delivered to the client device as the plurality of separate content files.

6. The method of claim 1, wherein forwarding the request to the first server causes the first server to perform a domain name service (DNS) lookup from a DNS server within the target geographic region.

7. The method of claim 1, wherein the first tunnel terminates at a first intermediate server, the first intermediate server being coupled to the first server via one or more second tunnels.

8. The method of claim 7, wherein selecting the first tunnel comprises determining that the first tunnel and the one or more second tunnels form an optimal path to the target geographic region.

9. The method of claim 7, wherein the first server and the first intermediate server are each associated with respective caches, and wherein forwarding the request causes the content to be synchronized across the respective caches.

10. A system comprising:

a non-transitory memory; and one or more hardware processors configured to read instructions from the non-transitory memory that, when executed, cause the one or more hardware processors to carry out operations comprising:

building a plurality of tunnels coupled to a corresponding plurality of servers each associated with a different geographic region;

receiving a request for content from a client device;

identifying a target geographic region associated with the request;

selecting a first tunnel among the plurality of tunnels, the first tunnel being coupled to a first server among the plurality of servers, the first server being associated with the target geographic region;

forwarding the request to the first server via the first tunnel;

receiving, via the first tunnel, content associated with the request; and delivering the content to the client device.

11. The system of claim 10, wherein the plurality of tunnels are coupled to the corresponding plurality of servers through a shared point of presence (POP) associated with a geographic region of client device.

12. The method of claim 10, wherein the content is received as an aggregate file associated with a plurality of separate content files.

13. The system of claim 12, wherein the operations further comprise de-aggregating the aggregate file to obtain the plurality of separate content files, wherein the content is delivered to the client device as the plurality of separate content files.

14. The system of claim 10, wherein forwarding the request to the first server causes the first server to perform a domain name service (DNS) lookup from a DNS server within the target geographic region.

15. The system of claim 10, wherein the first tunnel terminates at a first intermediate server, the first intermediate server being coupled to the first server via one or more second tunnels.

16. The system of claim 15, wherein selecting the first tunnel comprises determining that the first tunnel and the one or more second tunnels form an optimal path to the target geographic region.

17. The system of claim 15, wherein the first server and the first intermediate server are each associated with respective caches, and wherein forwarding the request causes the content to be synchronized across the respective caches.

18. A non-transitory computer readable medium storing instructions that, when executed by one or more hardware processors, cause the one or more hardware processors to carry out operations comprising:

building a plurality of tunnels coupled to a corresponding plurality of servers each associated with a different geographic region;

receiving a request for content from a client device;

identifying a target geographic region associated with the request;

selecting a first tunnel among the plurality of tunnels, the first tunnel being coupled to a first server among the plurality of servers, the first server being associated with the target geographic region;

forwarding the request to the first server via the first tunnel;

receiving, via the first tunnel, content associated with the request; and delivering the content to the client device.

19. The non-transitory computer readable medium of claim 18, wherein the plurality of tunnels are coupled to the corresponding plurality of servers through a shared point of presence (POP) associated with a geographic region of client device.

20. The non-transitory computer readable medium of claim 18, wherein the first tunnel terminates at a first intermediate server, the first intermediate server being coupled to the first server via one or more second tunnels, and wherein selecting the first tunnel comprises determining that the first tunnel and the one or more second tunnels form an optimal path to the target geographic region.

* * * * *